United States Patent
Carter et al.

(10) Patent No.: US 6,168,835 B1
(45) Date of Patent: Jan. 2, 2001

(54) FINISH FOR GLASS FIBER FABRIC

(76) Inventors: H. Landis Carter, 100 Ticonderoga Dr., Greer, SC (US) 29650; S. Joseph Milletari, 24 S. Del Norte Rd.; Shobha Murari, 1409 Roper Mountain Rd., Huntingdon Downs, Apt. #190, both of Greenville, SC (US) 29615

( * ) Notice: Under 35 U.S.C. 154(b), the term of this patent shall be extended for 0 days.

(21) Appl. No.: 09/439,519

(22) Filed: Nov. 12, 1999

Related U.S. Application Data

(63) Continuation of application No. 09/040,124, filed on Mar. 17, 1998, now Pat. No. 6,036,735.

(51) Int. Cl.[7] .............................. B05D 3/02; B05D 1/38; B05D 1/18; B05D 1/28
(52) U.S. Cl. ............... 427/386; 427/299; 427/389.7; 427/389.8; 427/407.2; 427/407.3; 427/421; 427/428; 427/429; 427/430.1
(58) Field of Search .................... 427/299, 386, 427/389.7, 389.8, 407.2, 407.3, 421, 428, 429, 430.1

(56) References Cited

U.S. PATENT DOCUMENTS

| | | | | |
|---|---|---|---|---|
| 4,147,578 | * | 4/1979 | Koss ..................................... | 156/245 |
| 4,344,989 | * | 8/1982 | Thornton et al. .................... | 427/286 |
| 4,347,278 | * | 8/1982 | Flautt et al. ......................... | 428/288 |
| 4,370,376 | * | 1/1983 | Gangal et al. ....................... | 428/241 |
| 4,654,235 | * | 3/1987 | Effenberger et al. ............. | 427/407.3 |

* cited by examiner

Primary Examiner—Timothy Meeks
Assistant Examiner—Michael Barr
(74) Attorney, Agent, or Firm—Cort Flint; William D. Lee, Jr.

(57) ABSTRACT

A finishing composition and method for applying the composition to a fabric woven from glass fibers or from a blend of glass fibers and other fibers such as polyamide or polyester. Such finishes significantly enhance the flex life of woven glass fabrics by improving the acid and alkali corrosion resistance of the fibers. The finish, which comprises fluoropolymer and epoxy resin, can be loaded into the fabric in multiple baths. Filtration products can be fabricated from the finished fabrics and they are especially useful for making filter bags used in the bag houses for central power generating stations and similar industries.

12 Claims, 2 Drawing Sheets

FINISH FOR GLASS FIBER FABRIC

This application is a continuation of application Ser. No. 09/040,124 filed on Mar. 17, 1998 now U.S. Pat. No. 6,036,735.

FIELD OF THE INVENTION

This invention relates to a finish which enhances the flex life of glass fibers, particularly of glass fibers in woven fabrics. More particularly, this invention relates to improving the flex life and corrosion resistance of glass filtration fabrics used to remove particulate matter and entrained solids from gases discharged in a wide variety of industrial processes. Even more particularly, this invention relates to a finishing composition for the filaments in glass filtration fabrics and to a method of applying the finish to render the fabrics acid and alkali resistant and extend their flex life. Such filtration fabrics are especially useful in fabricating the bags used in bag house filtration systems.

BACKGROUND

With the increasing concerns for the safety of the workplace and the quality of air, those industries which discharge gases containing particulate byproducts of their processes or which tend to create dust in their workplaces commonly use filtration of the gas or air as one method of solving the problem. These industries include, by way of example, the electric and gas utilities, refineries, asphalt and cement producers, foundries, and carbon black producers.

Since the environmental regulations are becoming significantly more strict, the foregoing industries have had to adapt highly efficient particulate removal methods and devices and give considerable attention to the control of very fine particles, trace element emissions, and plume opacity. To meet these stricter environmental regulations many of these industries have begun using a greater number of glass fabrics in their filtration systems. Glass fabrics offer many advantages, being inherently inert, but improvement is desired, particularly, in flex life after exposure to acids or alkalies. For example, as gases pass through the filtration fabric, dust particles are collected in the form of a "cake" which then becomes part of the filter medium. The collected dust or cake must be periodically removed from the filter to prevent significant loss of gas flow and this can be done during a cleaning cycle by reverse air, shake-deflate, and pulse jet methods. These cleaning cycles which require repeated flexing cause fabric fatigue so that an improved flex life is of prime importance.

One well-known system of gas filtration employs a plurality of filter bags which may be made from glass fiber. These bags are suspended, usually open end down, in closed compartments which form a structure known in the trade as a "bag house." As an example of one method of filtration and the arrangement of a bag house fabric filtration system, reference is made to U.S. Pat. No. 4,523,931, which issued to Richard L. Miller et al. An illustration of a method of cleaning a filter by pulsed air is disclosed in U.S. Pat. No. 4,331,459 which issued to George A. Copley on May 25, 1982. Another type of filter system, one for agglomerating and removing carbon black, is set forth in U.S. Pat. No. 4,579,567, which issued to Paul H. Johnson on Apr. 1, 1986. For a specific flexible filter bag design, reference is made to U.S. Pat. No. 4,877,526 which issued on Oct. 31, 1989 to Todd W. Johnson et al; and, for still another bag house and hanger arrangement reference is made to U.S. Pat. No. 3,710,559 which issued on Jan. 16, 1973 to Dale K. Harris.

In each of the foregoing patents, methods and apparatuses are described for using filters which require that the filter fabrics meet many exacting requirements including the need to be flexible and withstand the repeated cycles of flexing caused by back flow of cleaning air and other pressure changes. Accordingly, it is a general object of the present invention to provide gas filtration fabrics which will withstand a very high number of flexing cycles and the stress of reversed air flow.

As will be readily recognized about the foregoing mentioned industries and the gases discharged in their processes, the gases are often heated, and, in many instances, contains the products of incomplete combustion as well as complete combustion including the dust particle matter associated with the particular industry and its processes. A specific example is the burning of high sulphur content coal by the electric utilities. Thus, acids and alkalies at high temperatures in the range of as high as 300° F. to 500° F. or more in the discharge gases are to be expected and must be successfully accommodated. As mentioned above, when first placed in service, gases passing through a filter deposit particles therein and as the deposits build up the filter becomes more effective because the particles become part of the filter. This build up or "cake" reaches a point where flow becomes reduced and the pressure drop across the filter becomes unacceptably excessive. Flexing the filter by reversing the air flow is one way of removing the cake. Condensate can collect in the cake thus adding to the removal problem; and, flexing a filter to clean it after exposure to these chemically hostile conditions can result in breakdowns and ruptures of the fiber filaments within the fabric. Eventually, failure of the filter occurs thus requiring replacement of a bag or bags. Unplanned or too frequent filter replacements can be quite costly. Even with bypass systems which can shunt the gas discharge flow from one path to another, it is highly undesirable to have a failure in the bypass path while replacing filters in the primary path. Thus, another general object of the present invention is to provide a filter fabric which will reliably withstand the severe, adverse conditions caused by heated gases containing chemically reactive products.

To improve the strength, flexibility, and all around performance of glass fabrics, it has been a common practice to impregnate the fiber with one or more polymeric materials.

In U.S. Pat. No. 4,450,197 to Hager et al, which issued May 22, 1984, a method of impregnating a bundle of glass fibers with a polytetrafluoroethylene resin and a film-forming acrylic resin is disclosed which renders the fibers suitable for filtering fabrics for filtering flue gases. Other disclosures of glass fiber coated or loaded with fluoropolymers are U.S. Pat. No. 4,645,709; U.S. Pat. No. 4,323,603; and U.S. Pat. No. 3,790,403. It is desirable to have a coating or finish on the woven fibers that will reduce fiber-to-fiber abrasion. Coatings of fluorocarbon polymers are attractive because of the reduction in surface friction they offer. However, this same attribute makes bonding to a substrate difficult. Accordingly, another object of the invention is to provide an improved method of bonding fluorocarbons to a glass fiber substrate.

A specific object of the present invention is to provide a filtration fabric which has an extended life and reduces the number of times required to change filter bags. A further object of the present invention is to provide a filtration fabric with improved resistance to acid and alkali failures.

A still further object is to provide fabric which has extended flex life and is woven from glass fibers and/or other fibers These and other objects are accomplished by the present invention which is described more fully below.

SUMMARY OF THE INVENTION

It has been surprisingly discovered that the acidic and alkaline resistance and the flexibility of glass fabrics and/or fabrics woven from other suitable fibers can be significantly improved by a novel finish comprising a fluoropolymer and coupling agent; epoxy and curing agent therefor, and a fluorinated emulsion. The novel finish may be applied to fabrics by spraying, immersion, extrusion, rollers, or brushes.

In one aspect, the present invention is a novel, improved glass fiber fabric wherein glass fibers comprise a substrate which is bonded to a fluoropolymer finish by means of a coupling agent and a cured epoxy resin. The fluoropolymer finish to the fabric is applied in each of three successive baths followed by heat curing between baths. The fabrics may have other than glass, such as polyamide or polyester fiber.

In another aspect, the invention is a process for producing an acid and alkali resistant glass filtration fabric having extended flexure life comprising the steps of providing a glass fabric from which the sizing has been removed; passing the fabric through a bath comprising a major portion of water and a minor portion of fluoropolymer, coupling agent, and wetting agent whereby the fabric picks up the loading; removing, drying, and heat curing the loaded fabric; passing the fabric with the cured loading through additional baths and heat curing then loaded fabric after removal from each bath, one of said baths comprising a major portion of water and minor portions of a fluoropolymer and a silane coupling agent for the fluoropolymer, a surfactant, lubricating filler, and an epoxy resin and a curing agent for the epoxy; and, another of said baths comprising a fluorinated emulsion, whereby an acid and alkali resistant glass fabric is produced having an extended flexure life. In still another aspect, the present invention is the product produced by the foregoing process.

In still another aspect, the present invention is a surprisingly improved glass fiber filtration product comprising a fabric woven from glass fiber filaments, the filaments of said fabric having multiple loadings, one of which comprises a fluoropolymer and a coupling agent, another of which comprises a fluoropolymer bonded with the coupling agent of the prior loading and a cured epoxy resin; and still another of which comprises a heat cured fluorinated emulsion. Useful total loadings are in the range of 2% to 20% of the fabric weight after curing.

BRIEF DESCRIPTION OF THE DRAWINGS

While the novel features of the invention are set forth with particularity in the appended claims, the invention will be better understood and appreciated from the following detailed description taken in conjunction with the drawings in which:

DEFINITIONS

Figure 1:
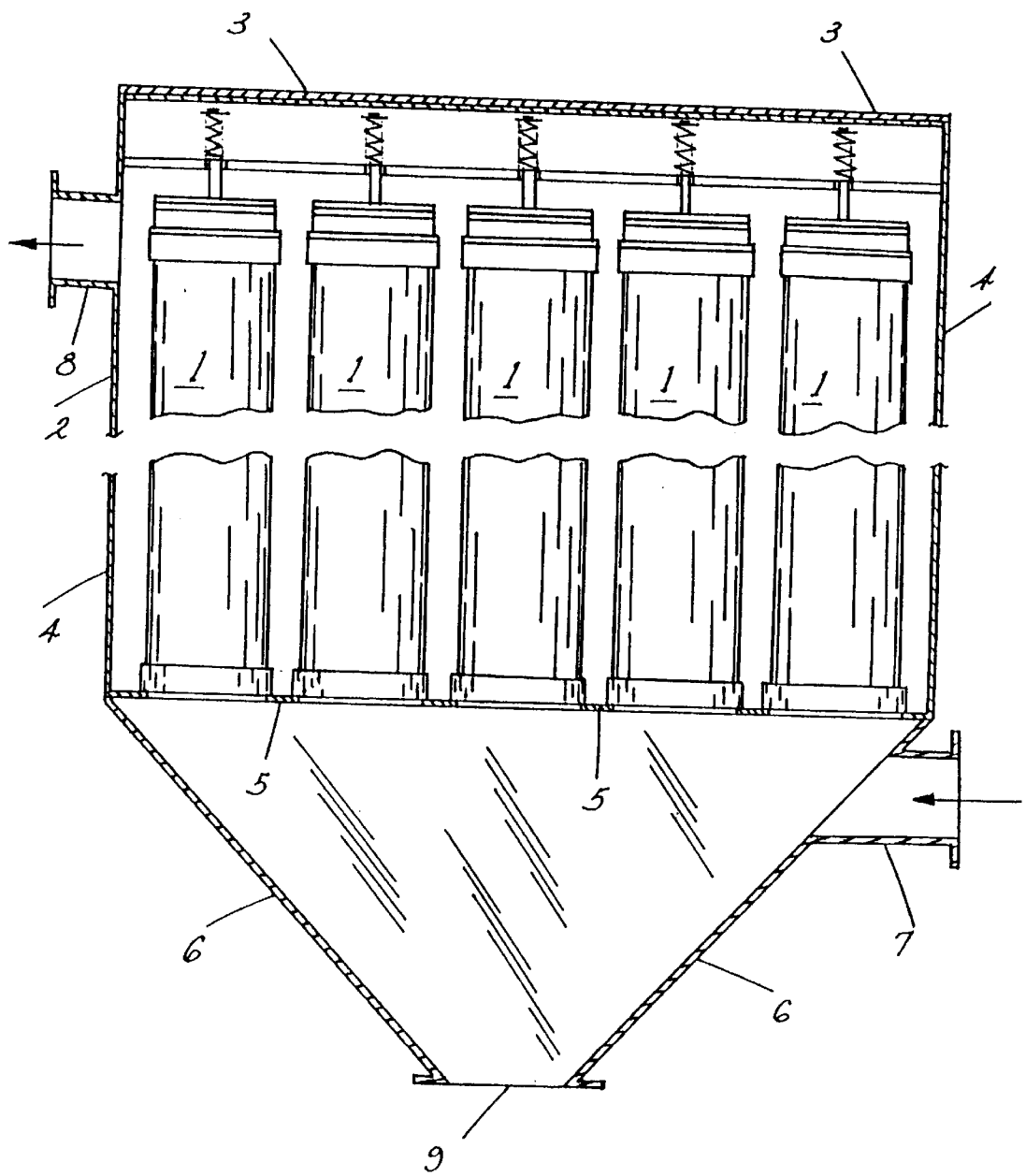
FIG. 1 is a vertical cross-sectional representation of one general type of bag house showing filter bags and their arrangement within the bag house and the gas flow path.

The following definitions are presented below to assist in better understanding of the invention and are presented by way of explanation and not limitation:

"Glass" and "glass fibers" or "filaments" as referred to herein are those glass fibers commonly sold in the United States by such suppliers as Owens-Corning Fiberglass Corporation of Toledo, Ohio or PPG Industries, Inc. of Pittsburgh, Pa.

"Filtration fabric" as used herein means a fabric woven from glass fibers and/or other fibers in a twill or other pattern. These fabrics will have a unit weight ranging from about 4 oz/yd$^2$ to about 30 oz/yd$^2$ with the preferred range being from about 8 to 22 oz/yd$^2$.

"Fluoropolymer" means a polymer made from monomers containing one or more atoms of fluorine and includes fluorocarbon resins such as polytetrafluoroethylene and also includes those resins sold, for example, under the Teflon trademark of the DuPont Company of Wilmington, Delaware or those fluorocarbon resins from ICI of the United Kingdom. The preferred fluorinated polymer of the present invention is the polytetrafluoroethylene better known as Teflon. In one prior art processes, the polytetrafluoroethylene coat on the glass fabric is a fine powder or dispersion type of polytetrafluoroethylene, sintered after application to the fabric. This type of polytetrafluoroethylene is also available in the form of an aqueous dispersion which can conveniently be used to coat the glass fabric. The average particle diameter of the polymer particles in the dispersion are generally between 0.1 to 0.5 micron, preferably at least 0.22 micron and more preferably at least 0.30 micron. Surfactant is usually present in the polytetrafluoroethylene aqueous dispersions in amounts from 1 to 15 percent by weight based on polytetrafluoroethylene solids to aid in wetting the surfaces to which they are applied.

Although Teflon is the preferred fluoropolymer, copolymers of tetrafluoroethylene and other fluoromonomers may also be used. The other monomer content will usually be from 1 to 35 percent based on the weight of the copolymer. The preferred monomers are the perfluoroalkylenes containing at least three carbon atoms such as hexafluoropropylene, perfluoro-(alkyl vinyl ethers) such as perfluoro-(propyl vinyl ether), and perfluorr-(2-mehtylene-4-methyl-1,3-dioxolane), Copolymers of tetrafluoroethylene and any of these monomers are compatible with the homopolymer, accordingly blends of Teflon and the copolymers are also contemplated by the present invention. The same surfactants and amounts used in the polytetrafluoroethylene dispersion can be used in the copolymer dispersion.

"Fluorosurfactants" as used herein, are, for example the non-ionic surfactants such as ethoxylated aliphatic alcohols and ethoxylated alkyl phenols, such as polyethylene glycol monopara-octyl phenyl ether ("Triton X-100") and those represented by the formula RA$_n$OH wherein A$_n$ is the group $(OC_2H_4)_n$ or a mixture of groups $(OC_2H_4)_n$ and $(OC_3H_6)_b$, wherein n in each instance is an integer from 2 to 50, preferably 2 to 18, b is an integer of 0 to 30, and a is an integer of at least 2, a+b being equal to n; R is an aliphatic group which can be saturated or unsaturated, straight-chained, branched, or cyclic, and will generally contain from 6 to 24 carbon atoms. A preferred species of surfactant is represented by the formula $CH_3(CH_2)_n(OCH_2CH_2)_mOH$ wherein n is an integer of 6 to 10 and m is an integer of 3 to 6. The fluorosurfactant is typically a fluorinated organic sulfonate or carboxylate and they can be obtained from 3M or duPont "Loading" as used herein means the weight or mass per unit area of fabric picked up during an application of finishing composition to the fabric. This can be expressed as ounces/square yard or as a percent of the unit weight of the fabric.

"Epoxy" means the family of resins containing the oxirane group and are available from suppliers such as the Shell Oil Company or from Ciba-Geigy. Suitable epoxy resins include glycidyl ethers prepared by the reaction of epichlorohydrin with a compound containing at least one hydroxyl group carried out under alkaline reaction conditions. The epoxy resin products obtained when the hydroxyl group-containing compound is bisphenol-A are represented below by structure I wherein n is 0 or a number greater than 0, commonly in the range of 0 to 10.

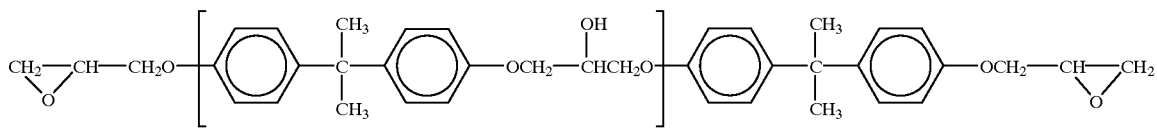

I

Other suitable epoxy resins can be prepared by the reaction of epichlorohydrin with mononuclear di- and trihydroxy phenolic compounds such as resorcinol and phloroglucinol, selected polynuclear polyhydroxy phenolic compounds such as bis(phydroxphenyl)methane and 4,4'-dihydroxybiphenyl, or aliphatic polyols such as 1,4-butanediol and glycerol. The preferred epoxy resins, typically derived from Bisphenol F epoxy resin having an epoxy equivalent of 156–250, may be used. The preferred epoxy resins for use in the invention are the liquid glycidyl polyethers of polyhydric phenols and polyhydric alcohols, particularly the diglycidyl polyethers of 2,2-bis(4-hydroxyphenyl)propane having a number average molecular weight generally within the range of about 340 to about 600, preferably about 350 to about 400, and a WPE of from about 175 to about 350. Such normally-liquid epoxy resins are available commercially from the above mentioned Shell Chemical Company as EPON™830, or preferably 6006/W70, for example.

"Coupling agent" means a chemical agent capable of reacting with the major components of composites to promote or form a stronger bond at the interface between components. Particularly useful are the silane coupling agents which have the ability to bond inorganic materials such as glass fibers and mineral fillers to organic resins. The preferred silane coupling agents are aminosilanes having the formula:

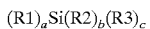

wherein R1 is a functional group with at least one primary amino group, R2 is a hydrolyzeable group selected from the group consisting of a lower alkoxy group having 1–8 carbon atoms, C1 to C8, an acetoxy group, or a halide group, and R3 is a nonreactive, non-hydrolyzeable group selected from the group consisting of a lower alkyl having 1–8 carbon atoms, or a phenyl group; with a being greater than or equal to 1; b being greater than or equal to 1; c being greater than or equal to 0, and with a+b+c=4. The preferred amino silane coupling agents are selected from the group consisting of N-2-(aminoethyl)-3-aminopropyltrimethoxysilane, 3-aminopropyltrimethoxysilane, 3-aminopropyltriethoxysilane and N-2aminoethyl-2-aminoethyl-3-aminopropyltrimethoxysilane. Such coupling agents are available from OSI.

"Fluorinated emulsion" means an emulsified mixture of monomers some of which contain fluorine atoms or fluorocarbon resins which are capable of polymerizing in an aqueous medium. A useful such emulsion suitable for the present invention comprises perfluoropolyether. The preferred perfluoroethers useful in the emulsions of the instant invention are described in U.S. Pat. Nos. 5,4188,181; 5,508,380; 5,562,911; 5,648,560; 5,670,088 and 5,698,138 all to Ausimont and their entire contents are incorporated by reference herein. Perfluoropolyethers are known in commerce under the trademark Fomblin™, Galden™ and Fomblin™ Z. The fluorinated polymers containing perfluoropolyoxyalkylene sequences and having thermoplastic elastomeric properties, are endowed with high flexibility at low temperatures and superior mechanical properties at high temperatures. Fluorinated emulsions, preferably FE20, may be purchased from Ausimont, USC or they may also be purchased from Advance Polymer.

"Curing" means changing the molecular structure of a plastic or resin by a chemical reaction and sometimes require heat or a catalyst or both. Curing agents are substances which promote or control the curing reaction and may be converted in the reaction. A curing agent for epoxy resin in the present invention is dicyandiamide sold by SKW Trostberg AG of Germany which is the dimer of cyanamide.

DETAILED DESCRIPTION

Figure 2:
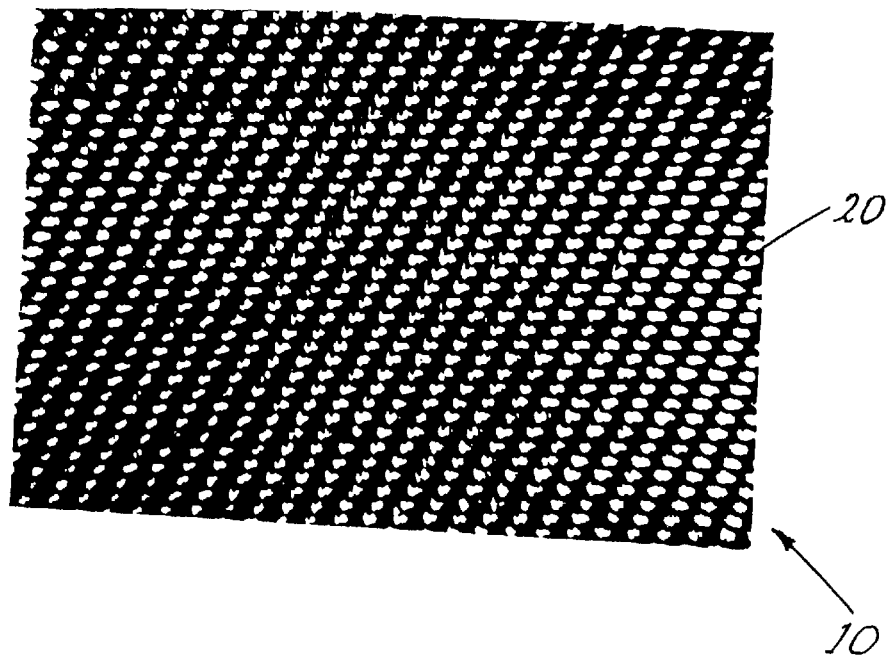
FIG. 2 is a segment of one fabric representing the best mode of the present invention in a twill weave; and, FIG. 3 is a schematic representation of the process of the present invention showing one of the multiple baths.

In one unique aspect, the present invention relates to fabrics woven from glass fibers and/or other fibers and to a method of enhancing the properties of such fabrics so they will have a long flex life and be suitable to serve as acid and alkali resistant filters. As an example, the making of glass fabrics begins with forming filaments from molten glass streams and loading these filaments with a sizing compound which protects them from abrasion and allows them to be more readily woven into fabrics. A typical twill weave would be a 3×1 twill and is a preferred pattern. In FIG. 2, fabric 10 with the preferred twill pattern 20 is shown. However, the present invention is not limited to any particular style, pattern, or type of weave.

In the preparation of a glass fabric with a desired weave pattern, the fabric selected is cleaned to remove sizing that had been applied and then is immersion finished in a aqueous bath to receive a fluorocarbon loading. The Teflon brand of fluorocarbon resin is preferred because of its low friction surface properties but other fluorocarbons can be used. To bond the fluorocarbon to the glass fiber, a heat activated, silane coupling agent is preferred. To reduce surface tension and increase penetration into the glass fiber surfaces, a surfactant is preferably included in the bath. After the bath, the loading picked up by the fabric is cured by heat. Curing temperatures may range from about 225° F. to about 500° F.

Another loading can be applied by an aqueous mixture of fluorocarbon coupling agent, graphite or a lubricating filler, and silicone is first prepared and mixed. An aqueous mixture of surfactant, epoxy curing agent and methyl imidazole as an accelerator is next prepared, mixed, combined with the first mixture and then the epoxy is added followed by immersion of the fabric from the first bath. After immersion the fabric is removed and again heat cured.

Another bath comprises a fluorinated emulsion and after the fabric is immersed and removed it is again heat cured.

Figure 3:
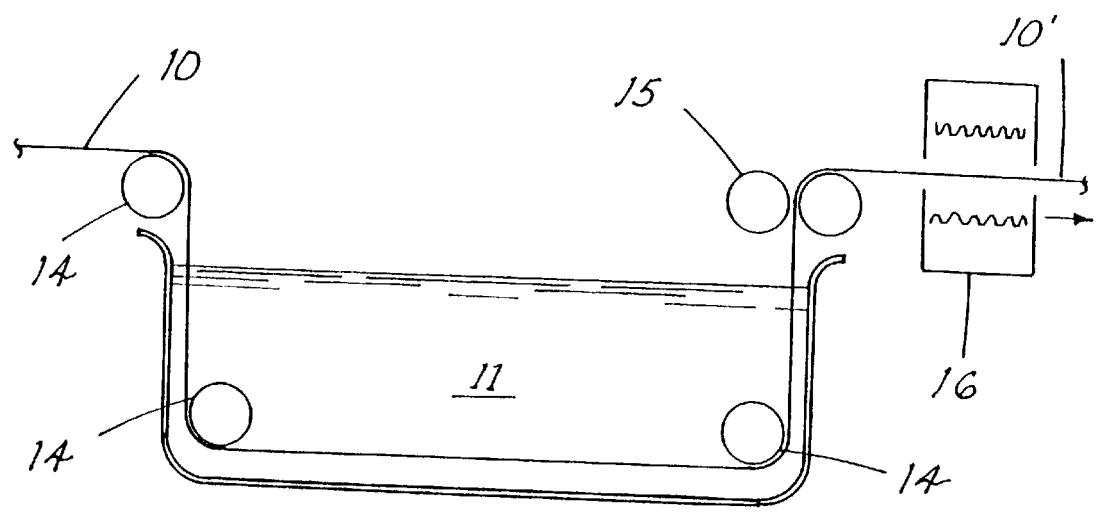

In a continuous finishing process as illustrated in FIG. 3, fabric 10 passes into and is immersed in a bath 11 being conveyed by rollers 14. As the fabric leaves bath 11 it passes through padded pinch rollers 15 where the pad pressure is adjustable to squeeze out excess composition and keep the fabric loading at the desired level. After leaving the pinch rollers the fabric is conveyed through an oven 16 which heats the fabric to the curing temperature of the loading composition. From the oven, it is then processed through as loaded fabric 10' to subsequent baths and cured. (The subsequent baths and curing can be by infrared ovens are not shown as they are similar in set up.) Upon completing the process the fabric has received multiple loadings which are cured. It is now finished fabric ready to be made into filter bags or other products.

Other curing processes can be used such as infra-red heating, and other methods of applying the finish can also be employed, namely spraying the components onto the fabric or foam loading the fabric as it passes through nip rolls.

Best Mode

In greater detail in the preferred process, after glass filaments are woven into a 3×1 twill pattern at about 9 oz/yd$^2$, the resulting fabric is cleaned to remove sizing, as mentioned above, to prepare it for the loading process of the present invention. The best mode of the preferred finishing process requires multiple baths to apply the total loading which provides the desired improvement in acid and alkali resistance and flex lifetime. The baths are at ambient temperatures and are as follows:

Bath A

| | |
|---|---|
| Fluoropolymer[1] | 20 vol. % (12% solids) |
| Amino silane[2] | 0.2 vol. % |
| Flourosurfactant[3] | 0.5 vol. % |
| Water | 79.3 vol. % |

[1]Teflon B, 60% solids in suspension (DuPont)
[2]A-1128 from OSI
[3]Zonyl FSN from 3 M Company of Minneapolis, Minnesota Fabric, after being passed through the bath, is cured in the temperature range of about 225° F. to about 400° F., and picks up a loading in the range of 10% to 15% of its weight.

Bath B

Bath B is prepared by first mixing two parts, (1) and (2), separately prior to combining.

Part 1

| | |
|---|---|
| Fluoropolymer[1] | 26 vol. % (15% solids) |
| Methylphenyl Silicone[4] | 10 vol. % (3.5% solids) |
| Graphite[5] | 5 vol. % (0.5% solids) |
| Water | 58% |
| Amino Silane[2] | 0.91% |

[4]AMI 1226 from AMI Industries
[5]KF-54 from Advance Polymer

The first four ingredients are mixed then the amino silane is added and stirred in.

Part 2

| | |
|---|---|
| Water | 72.6 vol. % |
| Flourosurfactant[3] | 5 vol. % (3% solids) |
| Dicyandianide[6] | 0.9% (0.09% solids) |
| Methyl Imidazole[7] | 0.03% (0.003% solids) |
| Epoxy Resin[8] | 26 vol. % (18.2% solids) |

[6]From SKW Trolberg AG
[7]From BASF
[8]From Shell Oil Company

All ingredients are first combined except for the epoxy. Then the epoxy is added and mixed in. After Parts 1 and 2 have been mixed separately they are combined and an equal volume of water is then added and mixed to complete the preparation of this bath.

The fabric which has been cured after the previous bath is placed in this bath and then dried and cured in the range from about 225° F. to 450° F.

Bath C

| | |
|---|---|
| Fluorinated emulsion[9] | 100% (20% solids) |

[9]Perfluoropolyether

The fabric after having been cured when removed from the previous bath or baths is now passed through this bath where it acquires an additional loading. It is then cured in the range from about 225° F. to 500° F. The resulting finished fabric is now ready for fabrication into filter bags or other products. While the present invention is not limited to the above sequence of steps, this sequence has provided the best results.

The above fabric with its finish according to the present invention as described in tests on the MIT flex tester, described below, has demonstrated flex life in the warp direction were in the range of five to ten times greater than typical values obtained from the best average of competitive acid-resistant finishes and about one to three times higher in the fill direction.

Two other fabric styles, one weighing about 13 oz/yd$^2$ and the other about 21 oz/yd$^2$ were also tested. Both of these styles tested at approximately twice the flex life in the warp direction as the competitive samples. This demonstrates the enhanced flex life imparted to fabrics of different weights by the finish of the present invention.

As mentioned above, to determine the acid resistance and flex life of the fabrics prepared according to the present invention, a modification of ASTM D 2176, "Folding Endurance of Paper by MIT Tester," was used. To prepare the samples, a 1.0 N solution of sulphuric acid was heated to about 80° C. (175° F.). Strips of fabric 0.75" by 5" were cut, immersed in the acid, removed, dried, and then subsequently immersed and dried for a total of four cycles. The strips were conditioned for up to one hour at 500° F. Afterwards, the strips were then subjected to flex endurance tests in the MIT Tester, at a load of 4 pounds, within eight hours of the acid bath conditioning. In tests corrected to 55% humidity on 9.0 oz/yd$^2$ the warp direction abrasion values were five to ten times greater than the best industry average for five samples and one to three times higher in the fill direction. In the flex tests as well as actual use, the warp filaments are thought to cut the fill filaments so that fill direction failures occur earlier.

The finished fabric can readily be made into bags for use in bag houses for many industries or for other filter applications. The bags are especially useful for the electric utilities where the bag houses filter the "exhaust" or "smoke stack" gases from central stations. Such bags may be, typically, thirty or more feet in length and about one foot in diameter as represented by bags 1 in FIG. 1. These bags are suspended vertically in racks in the bag houses and in many methods and means of suspending such bags are found in the prior art.

Referring to FIG. 1, a typical arrangement is shown in which is a representation taken from aforementioned U.S. Pat. No. 3,710,559. In FIG. 1, filter bags 1 are suspended in a bag house generally depicted at 2 having a top wall 3, sidewalls 4, a floor plate 5, a solid discharge hopper 6, and inlet 7 for gases to be cleaned of entrained solids, and outlet 8 for removal of cleaned gases, and an outlet 9 for solid material removed from the gases by the bags. This arrangement is by way of illustration, it is not limiting on the present invention. It is however similar to the arrangement found in current high sulfur coal burning central station for electric utilities.

In addition to glass fabric finishing the present invention will extend the flex life of fabrics made from other fibers such as blended with polymer fibers such as polyamide and polyester. The curing temperature ranges for the finish used for blends of polymeric fibers will necessarily be below the melt temperature range of the polymer.

The invention has been described with the reference to particular materials, methods, and fabrics and particular arrangements and functions thereof, but it will be understood that other embodiments will become apparent to those skilled in the art which are within this scope of the invention defined in the following claims:

What is claimed is:

1. A process of finishing fabrics woven from glass fibers and/or other fibers to increase the flexure life of said fabrics comprising the steps of:
   a) cleaning said fabric to substantially remove sizing applied to the fiber filaments of the fabric prior to weaving;
   b) loading said cleaned fabric with a fluoropolymer, coupling agent for the fluoropolymer, an epoxy resin, and curing agent for the epoxy wherein said fluropolymer and said epoxy bond directly to said fibers providing improved resistance to flex cracking caused by acidic and alkaline corrosion.

2. The process of claim 1 wherein said fibers are glass fibers and the loading step is accomplished by immersion in an aqueous-based bath.

3. The process of claim 1 wherein the fluoropolymer is polytetrafluoroethylene.

4. A process for finishing filtration fabrics woven from fibers selected from the group consisting of glass fibers, polymeric fibers, and blends thereof to impart an extended flexure life comprising the steps of:

a) providing a cleaned fabric woven from said fibers wherein the sizing has been removed from the fibers;
   b) passing the fabric through a first bath wherein the major portion by volume of said bath comprises water and the minor portion of said bath comprises a flouropolymer, coupling agent, and wetting agent wherein the fabric receives a loading;
   c) removing the fabric from said bath, drying, and heat curing the loading on the fabric wherein said fluropolymer bonds directly to the fibers in the fabric;
   d) passing the fabric with said cured loading through a second bath wherein the major portion of said bath comprises water and the minor portion of the bath comprises fluoropolymer and a silane coupling agent for said fluoropolymer, a surfactant, lubricating filler, and an epoxy resin and curing agent and accelerator for said epoxy resin, whereby said previously loaded fabric receives a loading comprising said epoxy;
   e) removing said fabric from the second bath, drying, and heat curing said fabric with the loading comprising an epoxy resin whereby said epoxy bonds directly to the fibers of the fabric;
   f) passing said fabric through a third bath comprising a fluorinated emulsion to receive a loading of said emulsion; and,
   g) removing said fabric from the third bath, drying, and heat curing the fabric with the fluorinated emulsion loading whereby an acid and alkali resistant finished fabric is produced having extended flexure life.

5. The process of claim 4 wherein the fluoropolymer of the baths comprises polytetrafluoroethylene and the fibers are glass fibers.

6. The process of claim 4 wherein said fluorinated emulsion comprises a perfluoropolyether.

7. The process of claim 4 wherein the curing temperature of each loading after each bath is in the range of about 225° F. to about 500° F.

8. The process of claim 4 wherein the fluoropolymer of the first bath is in a suspension having about 60% solids by weight.

9. The process of claim 4 wherein the lubricating component is graphite and the accelerator is methyl imidazole.

10. The process of claim 4 wherein the loading of the fabric is performed by spraying or foaming the respective bath compositions onto the fabric.

11. The process of claim 4 wherein said loading of the fabric is performed by rolling or brushing the respective bath compositions onto the fabric.

12. The process of claim 4 wherein the loading of the fabric is performed by foaming the respective bath compositions and applying said foamed compositions to the fabric.

* * * * *